June 18, 1940. K. E. WHITNEY 2,205,162

BIMETALLIC ELEMENT

Filed July 14, 1937

INVENTOR.
Kenneth E. Whitney
BY Stephen Cerstvik
ATTORNEY.

Patented June 18, 1940

2,205,162

UNITED STATES PATENT OFFICE 2,205,162

BIMETALLIC ELEMENT

Kenneth E. Whitney, Baltimore, Md., assignor to Bendix Aviation Corporation, South Bend, Ind., a corporation of Delaware Application July 14, 1937, Serial No. 153,662

1 Claim. (Cl. 297—15)

The present invention relates to temperature recorders and/or indicators and more particularly to the temperature responsive elements used therein to actuate the recording pen or an indicating pointer.

Heretofore, in instruments of the class described, the temperature responsive element was generally in the form of a sealed flexible container, such as a Bourdon tube, filled with a liquid adapted to expand and contract with changes in temperature, thereby flexing the Bourdon tube one end of which was fixed and the other end freely movable in accordance with the temperature changes. The movement of the free end was then used to actuate a recording pen or indicating pointer through suitable transmitting and amplifying mechanism. Sometimes an ordinary bimetal strip was used in lieu of the flexible liquid-filled container, one end of the strip being fixed and the other end freely movable in substantially the same manner as the Bourdon tube.

With these prior art devices it was found, however, that when a change in temperature from 30° F. to 70° F., for example, was to be recorded or indicated, it required one hour to record the change of 40°, i. e., it took one hour for the temperature responsive element to sense the change before the element came to rest in its movement due to the 40° change in temperature.

It is known that with mercury thermometers a change in temperature is perceived much more quickly, i. e., a change from 30° F. to 70° F. is indicated by the thermometer in ten minutes or less, but there is no practical way in which the mercury column of the thermometer can be made to record the temperature changes.

Accordingly, one of the objects of the present invention is to provide in a temperature recorder or indicator, a novel temperature-responsive element which responds very quickly to changes in temperature whereby lag in response is substantially eliminated.

A further object is to provide a novel temperature-responsive element in which the effective area exposed to temperature is substantially increased without materially increasing the mass of the element thereby eliminating lag and producing an exceptionally sensitive element.

Still another object of the invention is to provide a novel temperature-responsive element in which the ratio of the exposed area to the mass of the element is greatly increased to substantially eliminate lag in the response of the element to temperature changes.

Another object is to provide a multi-metal thermostatic strip of given length and thickness and having means for increasing the ratio of area to mass of said strip as compared to a strip having the same length and thickness but not having such means.

A still further object is to provide a novel temperature-responsive element in the form of a bimetal strip having a relatively large area and relatively small mass, the increased ratio of area to mass being produced by providing fins of lightweight heat-conducting material on the bimetal strip, thereby producing a sensitive lagless temperature-responsive element which is simple, effective, inexpensive to manufacture and use, and which can be made in large quantities on a production basis.

The above and other objects and advantages of the invention will be more fully apparent hereinafter from a consideration of the detailed description which follows, taken together with the accompanying drawing wherein two embodiments of the invention are illustrated. It is to be expressly understood, however, that the drawing is for the purposes of illustration only and is not to be construed as defining the limits of the invention, reference being had for this purpose to the appended claim.

In the drawing, wherein like reference characters refer to like parts throughout the several views, Fig. 1 is a side elevation of one form of temperature recorder embodying the invention;

Figure 1:
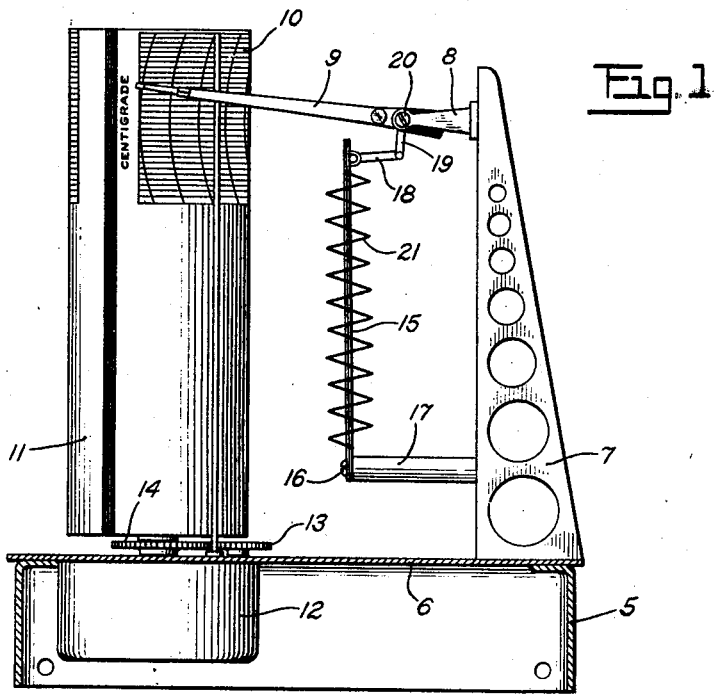

The invention consists substantially in the construction, combination, form, location and relative arrangement of parts for obtaining the results desired in accordance with the foregoing objects, as will be more fully hereinafter set forth in the specification, as shown in the drawing by way of example, and as finally pointed out in the claim.

It is known that the deflection of a thermostatic bimetal strip varies directly with the square of the length, inversely with the thickness, and directly with temperature change. Thus, a strip 2 inches long will have one fourth the deflection of a four inch strip, and a strip .025 of an inch thick has double the deflection of one .050 of an inch thick. Therefore, if, in order to reduce lag, it is attempted to reduce the mass by reducing the length or the thickness of the strip, the deflection is also changed. On the other hand, if it is desired to increase the effective area by increasing the length or thickness of the strip, again the amount of deflection will be changed.

In accordance with the present invention, the lag in a temperature-responsive element is substantially eliminated by reducing the mass without decreasing either the length or thickness of the element and by increasing the effective area without increasing the length or thickness, thereby increasing the ratio of area to mass without changing the amount of deflection desired and produced by an element of given length and thickness. This is accomplished by tapering the element lengthwise so that the width of the element decreases from one end to the other and by providing heat-conducting fins of lightweight heat-conducting material, extending either transversely of the edges of the element along its length or transversely across the width of the element along its length. The tapering reduces the mass of the element and the fins increase its effective area so that for a given length and thickness of material, a thermostatic element formed, constructed and arranged according to the invention, has a high ratio of area to mass as compared to an element of the prior art and having the same length and thickness.

By virtue of this high ratio of effective area to mass, the element is substantially lagless and, therefore, responds very quickly to temperature changes. Tests with a thermostatic bi-metal strip of the invention embodied in a temperature recorder showed that when the element was subjected to a change from 30° F. to 70° F. (by taking the recorder out of a refrigerator and into room temperature) it required only ten minutes for the recorder to indicate the change as compared to one hour with a prior art recorder. Thus, the lag has been reduced six fold by the present invention.

Referring now to the drawing, and more particularly to Fig. 1, there is shown a temperature recorder provided with the novel lagless temperature-responsive element of the invention. As illustrated, the recorder comprises a hollow base 5 provided with a top plate 6 on which there is secured an upright member 7 projecting upwardly from the base. Pivotally mounted in a fork 8 secured to or formed integrally with the upright member 7 is a recording pen or indicating pointer 9. The recording pen or pointer 9 cooperates with and traverses a temperature scale 10 which is in the form of a recording chart secured to a rotating drum 11 when the instrument is a recorder as shown.

The drum 11 is adapted to be rotated about a vertical axis at a constant desired speed so that a time-temperature record is produced on the recording chart 10 by the recording pen 9. For this purpose there is provided a clock mechanism 12 mounted inside of the hollow base 5 beneath the top plate 6. The clock mechanism may be a spring wound clock of any suitable type or a "Telechron" electric clock. A short shaft (not shown) of the clock mechanism projects upwardly through the plate 6 and has secured thereto a gear 13 which meshes with and drives a gear 14 secured to a driving shaft (not shown) which is located centrally inside of and drives the drum 11 which carries the recording chart.

The novel means of the invention comprise a bimetal temperature-responsive strip 15 having one end thereof fixed and secured in any suitable manner, as by means of screws 16, to a post 17 carried by and projecting from the upright member 7. The other end of said strip is movable due to warping of said strip upon changes in temperature in a manner well-known to those skilled in the art, and is pivotally connected to links 18 and 19, the link 19 being rigidly secured to a rockshaft 20 journaled in the fork 8, and the rockshaft 20 having secured thereto the recording pen or indicating arm 9.

From the foregoing it will be seen that when the temperature changes, the bimetal strip 15 will warp, thereby causing the upper end thereof to move to the left or right, as viewed in Fig. 1, and, therefore, will actuate the recording or indicating arm 9 through links 18 and 19 and rockshaft 20 so that said arm 9 will move upwardly and downwardly over the temperature scale 10 in accordance with changes in temperature as the chart is rotated with drum 11 by the clock mechanism 12.

In accordance with the invention, the ratio of the exposed area of the strip 15 to its mass is increased whereby lag in response of the strip to temperature changes is substantially eliminated. For this purpose, the bimetal strip 15 (Fig. 2) is made substantially wider at its fixed or lower end and narrower at its movable or upper end so that the strip tapers to more or less of a point at the movable end, thereby reducing the inertia of said strip at its working end but still providing a relatively large exposed area while maintaining the driving power the same. To further increase the ratio of area to mass of the element 15, the latter is provided with a plurality of heat-conducting fins 21 and 22 of relatively lightweight heat-conducting material such as thin copper ribbon, zinc ribbon, thin sheet zinc, bronze, brass or beryllium copper, the latter three metals being more resilient.

Figure 2:
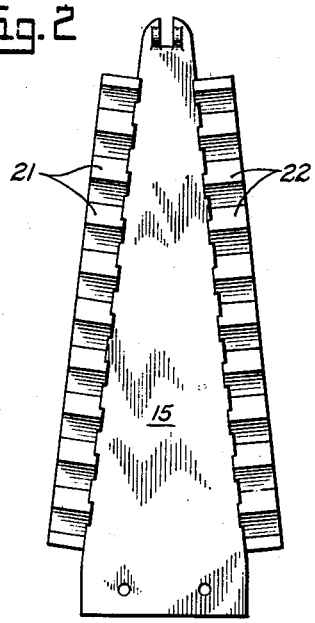
Fig. 2 is an enlarged plan view of the novel temperature-responsive element embodying the invention.

According to one embodiment of the invention the heat-conducting fins are attached to the edges of the multi-metal strip and transversely of said edges along the length of the strip, as shown in Figures 1 and 2 of the drawing.

As shown in Figs. 1 and 2, the fins 21 and 22 are formed by crinkling a thin metal ribbon in zigzag form and attaching one zigzag ribbon edgewise, as by brazing or soldering, to one edge of the strip 15 and another ribbon in the same manner to the other edge of the strip so that the strip is provided with fins extending transversely of the edges along the length of the strip. The fins being of extremely thin metal are very flexible and, therefore, do not interfere with the deflection of the thermostatic strip and do not add any appreciable mass thereto. Also, because of the extreme thinness of the fins, they provide a large area with little mass. By virtue of the arrangement of the fins, heat is also transferred to the strip throughout its length by convection, thereby further increasing the sensitivity and action of the strip and, hence, further decreasing the lag.

The tapering of the strip causes the latter to maintain maximum driving power with minimum mass upon flexure of the strip so that said strip can be utilized to actuate controls which require more power for actuation than a pointer or recording pen. For example, by suitable mechanism, the strip can be made to actuate a switch or a valve or any other element of some form of control device.

Figure 3:
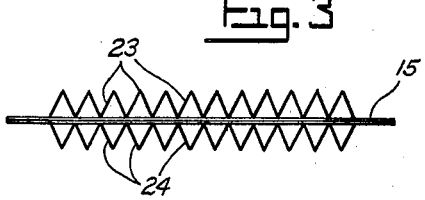
Fig. 3 is a side view of another form of the novel temperature-responsive element embodying the invention.
Figure 4:
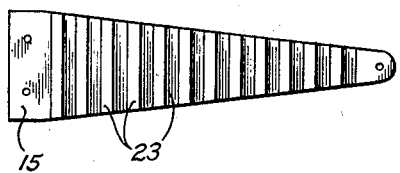
Fig. 4 is a plan view of the temperature-responsive element shown in Fig. 3.

According to another embodiment of the invention, the heat-conducting fins are attached to the multi-metal strip across both faces thereof along its length, as shown in Figures 3 and 4 of the drawing.

In Figs. 3 and 4, is shown another form of novel temperature-responsive element embodying the invention, which may be substituted for the element shown in Figs. 1 and 2. In this second embodiment the strip 15 also tapers in its width from one end to the other as in Figs. 1 and 2 but relatively wider metal ribbons are used to form heat-conducting fins 23 and 24, the ribbons tapering in width in accordance with the taper of the strip. The ribbons are crinkled lengthwise, as in Figs. 1 and 2, and then are attached to the faces of the strip 15 instead of to its edges so that the heat-conducting fins 23 and 24 extend transversely across the width of the strip on both sides along its length. The fins 23 and 24, like the fins 21 and 22, do not add any appreciable amount of mass to the strip and do not interfere with its deflection and yet provide a substantial increase in the effective area of the strip so that the ratio of area to mass is materially increased without changing the deflection normally produced by a strip of given length and thickness.

There is thus provided a novel temperature-responsive element so formed, constructed and arranged that for a given length and thickness of the element the ratio of the effective area to the mass of the element is greatly increased while the length and thickness are maintained, whereby the amount of deflection for the given length and thickness remains unchanged but lag is substantially eliminated.

Although only two embodiments of the invention have been illustrated and described, various changes in the form, construction and relative arrangement of the parts, which will now appear to those skilled in the art to which this invention appertains, may be made without departing from the spirit or the scope of the invention. Reference is, therefore, to be had to the appended claim for a definition of the limits of the invention.

What is claimed is:

A flat bimetallic element tapering from end to end and having secured to an edge thereof in heat conducting relation therewith a thin flexible metal ribbon crinkled in zigzag form.

KENNETH E. WHITNEY.